(12) United States Patent
Japala

(10) Patent No.: US 9,586,439 B2
(45) Date of Patent: Mar. 7, 2017

(54) ENHANCED STATIC RUNFLAT SYSTEM ASSEMBLY

(76) Inventor: Vishweshwarrao Japala, Hyderabad (IN)

( * ) Notice: Subject to any disclaimer, the term of this patent is extended or adjusted under 35 U.S.C. 154(b) by 126 days.

(21) Appl. No.: 14/009,115

(22) PCT Filed: Mar. 28, 2012

(86) PCT No.: PCT/IN2012/000206
§ 371 (c)(1),
(2), (4) Date: Oct. 1, 2013

(87) PCT Pub. No.: WO2012/131712
PCT Pub. Date: Oct. 4, 2012

(65) Prior Publication Data
US 2014/0246896 A1 Sep. 4, 2014

(30) Foreign Application Priority Data
Apr. 1, 2011 (IN) .......................... 1110/CHE/2011

(51) Int. Cl.
*B60C 17/00* (2006.01)
*B60B 11/10* (2006.01)
*B60C 17/06* (2006.01)
*B60C 15/028* (2006.01)

(52) U.S. Cl.
CPC .............. *B60B 11/10* (2013.01); *B60C 17/06* (2013.01); *B60C 15/028* (2013.01); *B60C 2017/063* (2013.04)

(58) Field of Classification Search
CPC B60B 1/00; B60B 3/12; B60B 31/005; B60B 3/08; B60C 17/00
USPC ............ 301/8; 152/518, 400, 520, 158, 516, 152/381.5
See application file for complete search history.

(56) References Cited

U.S. PATENT DOCUMENTS

| | | | | |
|---|---|---|---|---|
| 1,572,041 | A | * | 2/1926 | Rogers ........................... 48/85.1 |
| 5,361,817 | A | * | 11/1994 | Chen .............................. 152/520 |
| 5,690,762 | A | * | 11/1997 | Bock et al. .................... 152/520 |
| 6,564,842 | B2 | * | 5/2003 | Abinal et al. ................. 152/516 |
| 6,814,114 | B2 | * | 11/2004 | Bouvier et al. ............... 152/158 |
| 7,188,649 | B2 | * | 3/2007 | Ishida et al. .................. 152/158 |
| 7,347,240 | B2 | * | 3/2008 | Tanaka ....................... 152/381.5 |
| 7,360,570 | B2 | * | 4/2008 | Ishida ........................... 152/516 |
| 8,196,629 | B2 | * | 6/2012 | Gardetto ....................... 152/401 |
| 2001/0032692 | A1 | * | 10/2001 | Nguyen et al. ............ 152/381.5 |
| 2001/0052378 | A1 | * | 12/2001 | Masson et al. ................ 152/516 |
| 2002/0036044 | A1 | * | 3/2002 | Heuze et al. ................. 152/520 |
| 2003/0209301 | A1 | * | 11/2003 | Pompier et al. .............. 152/158 |
| 2006/0196588 | A1 | * | 9/2006 | Ishida et al. .................. 152/152 |
| 2010/0096059 | A1 | * | 4/2010 | Lust ............................. 152/518 |

* cited by examiner

Primary Examiner — Hau Phan
(74) Attorney, Agent, or Firm — Mark M. Friedman

(57) ABSTRACT

An enhanced static runflat system is disclosed. According to an exemplary embodiment of the present invention, at least one predefined structural stopper provided on the outer peripheral surface of the cylindrical section of the wheel rim, whereby at least one predefined structural stopper secures, an inner circumference of the annular static runflat to an outer circumference of the wheel for arresting a movement of the static runflat over the wheel rim.

7 Claims, 2 Drawing Sheets

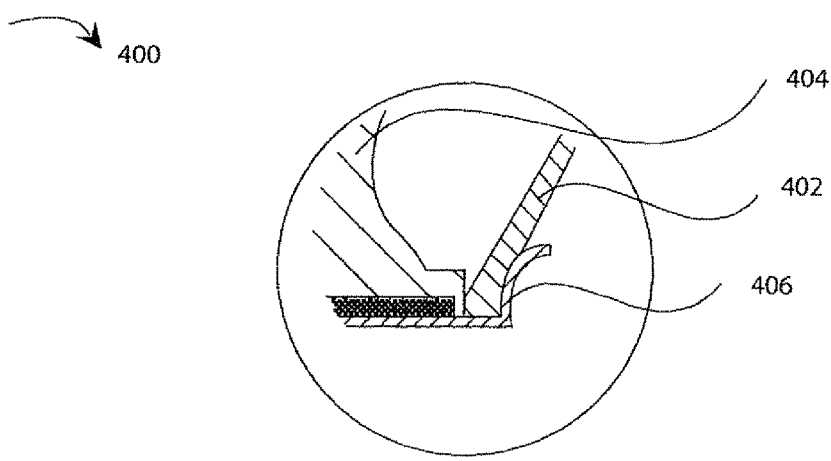

ENHANCED STATIC RUNFLAT SYSTEM ASSEMBLY

TECHNICAL FIELD OF THE INVENTION

The present invention generally relates to a runflat system assembly. More particularly the present invention is related to an arrangement of a runflat device on a wheel rim which eliminates a relative motion between the wheel and the runflat device in an under-inflated or deflated or run-flat condition making it really Static Runflat System.

BACKGROUND OF THE INVENTION

Generally, various runflat devices are proposed for supporting the tires in an under-inflated or deflated or run-flat condition. The purpose of these runflat devices is to provide a support to the tire in the event of loss of pressure by various un desirable reasons.

Generally, heavy braking, travel on rough bumpy surfaces, under inflated tyres could cause undesirable relative movement between the wheel and surrounding runflat device over the life time of runflat system causing the formerly balanced wheel assembly subjected to undesirable vibrations. The conventional methods to secure the runflat system to the wheel rim include usage of cam locks, bolts, or elastic bands, or the like. The Runflat system performance is limited due to wheel dimensional tolerance, ovality, irregular wheel surfaces and uneven wheel finish thereby resulting in an undesirable rotation of the runflat over the wheel rim.

Moreover, the conventional wheel rims that are manufactured by rolling of steel sheet and joined by welding and show higher dimensional tolerances above +/−0.1 mm in comparison with casted/forged and machined wheels. when perfectly machined Runflat system is assembled on the steel wheel rim due to the higher dimensional tolerances the static runflat system do not mate thoroughly and tend to rotate over the wheel under extreme conditions which causes reduced tyre traction, travel distance and ultimately leads to premature failure of runflat system.

In light of the aforementioned disadvantages associated with the conventional secured runflat systems, there clearly exists a need for an improved method for securing the runflat device to the wheel rim for supporting the tire in an under-inflated, deflated or run-flat condition and which would assist in increasing the operational capability of a static runflat system.

Generally most of the runflat systems are made of rubber based or visco elastic polymer materials that are secured around the wheel rim with metal locking cams, elastic bands or other locking systems and are always under tension. As most of the visco elastic materials creep over a period of time under constant stress, so a runflat systems that is tightly locked to rim over a period of time tend to loosen, move, rotate in underinflated conditions and if un attended causes vibrations noises and wheel imbalances

BRIEF SUMMARY OF THE INVENTION

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

A more complete appreciation of the present invention and the scope thereof can be obtained from the accompanying drawings which are briefly summarized below and the following detailed description of the presently preferred embodiments.

An enhanced static runflat system assembly is disclosed. According to a first aspect of the present invention, an enhanced static runflat system assembly includes a wheel rim comprising a cylindrical section intermittent and a rim base comprising a flange extending radially outwards from two axial ends, whereby a plurality of circular beads of a tire securely mounted on the wheel rim. The wheel rim includes a drop center wheel rim, a flat wheel rim, bolt on wheel, multi piece wheel or the like used for vehicle mobility, transport or conveyance.

According to the first aspect of the present invention, the enhanced static runflat system assembly includes an annular static runflat device removably secured to an outer peripheral surface of the cylindrical section of the wheel rim, whereby the annular static runflat device further spaced from the properly inflated tire and to be engaged to an inner peripheral surface of the tire. The annular static runflat device includes a plurality of segments. An inner peripheral surface of the annular static runflat device includes at least one structural provision for securing with the outer peripheral surface of the cylindrical section of the wheel rim.

According to the first aspect of the present invention, the enhanced static runflat system assembly includes at least one predefined structural stopper provided on the outer peripheral surface of the cylindrical section of the wheel rim, whereby at least one predefined structural stopper secures an inner circumference of the annular static runflat system to an outer circumference of the wheel (shown is Illustration) for arresting a movement of the static runflat system over the wheel rim.

According to a second aspect of the present invention, the enhanced static runflat system assembly includes an annular static runflat device including at least one structural provision along an inner peripheral surface, whereby the annular static runflat device removably secured to an outer peripheral surface of a cylindrical section of a wheel rim. The wheel rim comprising a cylindrical section intermittent and a rim base comprising a flange extending radially outwards from two axial ends. The annular static runflat device further spaced from the properly inflated tire.

According to the second aspect of the present invention, the enhanced static runflat system includes at least one predefined structural stopper provided on the outer peripheral surface of the cylindrical section of the wheel rim for enabling the at least one static runflat system to removably secure to the outer peripheral surface of the cylindrical section of the wheel rim.

BRIEF DESCRIPTION OF THE DRAWINGS

The above-mentioned and other features and advantages of this present disclosure, and the manner of attaining them, will become more apparent and the present disclosure will be better understood by reference to the following description of embodiments of the present disclosure taken in conjunction with the accompanying drawings.

FIG. 3 is a diagram depicting a sectional view of a flat wheel and an annular static runflat.

FIG. 4 is a diagram depicting fragmental views of a flat wheel and an annular static runflat.

DETAILED DESCRIPTION OF THE INVENTION

Figure 1:
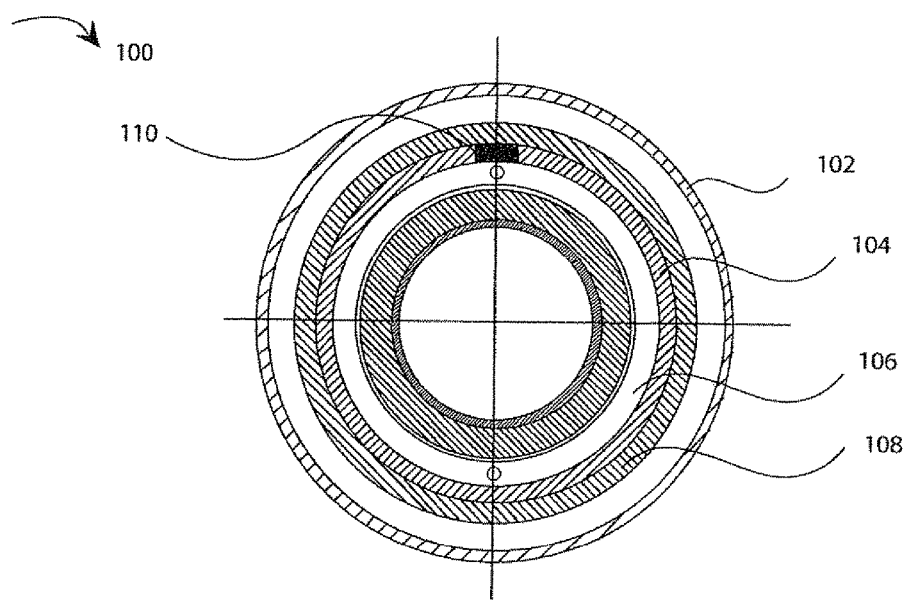
FIG. 1 is a diagram depicting a sectional view of a drop center wheel and an annular static runflat.

It is to be understood that the present disclosure is not limited in its application to the details of construction and the arrangement of components set forth in the following description or illustrated in the drawings. The present disclosure is capable of other embodiments and of being practiced or of being carried out in various ways. Also, it is to be understood that the phraseology and terminology used herein is for the purpose of description and should not be regarded as limiting.

The use of "including", "comprising" or "having" and variations thereof herein is meant to encompass the items listed thereafter and equivalents thereof as well as additional items. The terms "a" and "an" herein do not denote a limitation of quantity, but rather denote the presence of at least one of the referenced item. Further, the use of terms "first", "second", and "third", and the like, herein do not denote any order, quantity, or importance, but rather are used to distinguish one element from another. For a better understanding, components of the described embodiment are labeled with three digit component numbers. In general, the same first digit is used throughout the entire component numbers numbered and labeled within a figure. Like components are designated by like reference numerals throughout the various figures.

Exemplary embodiments of the present invention are directed towards an enhanced static runflat system assembly. According to a first aspect of the present invention, an enhanced static runflat system assembly includes a wheel rim comprising a cylindrical section intermittent and a rim base comprising a flange extending radially outwards from two axial ends, whereby a plurality of circular beads of a tire securely mounted on the wheel rim. The wheel rim includes a drop center wheel rim, a flat wheel rim, a bolt on wheel, a multi piece wheel or the like used for vehicle mobility, transport or conveyance.

According to the first aspect of the present invention, the enhanced static runflat system includes an annular static runflat device removably secured to an outer peripheral surface of the cylindrical section of the wheel rim, whereby the annular static runflat device further spaced from the properly inflated tire and to be engaged to an inner peripheral surface of the tire. The annular static runflat device includes a plurality of segments. An inner peripheral surface of the annular static runflat device includes at least one structural provision for securing with the outer peripheral surface of the cylindrical section of the wheel rim.

According to the first aspect of the present invention, the enhanced static runflat system assembly includes at least one predefined structural stopper provided on the outer peripheral surface of the cylindrical section of the wheel rim, whereby at least one predefined structural stopper secures an inner circumference of the annular static runflat system to an outer circumference of the wheel for arresting a movement of the static runflat system over the wheel rim.

According to a second aspect of the present invention, the enhanced static runflat system includes an annular static runflat device including at least one structural provision along an inner peripheral surface, whereby the annular static runflat device removably secured to an outer peripheral surface of a cylindrical section of a wheel rim. The wheel rim comprising a cylindrical section intermittent and a rim base comprising a flange extending radially outwards from two axial ends. The annular static runflat device further spaced from the properly inflated tire.

According to the second aspect of the present invention, the enhanced static runflat system includes at least one predefined structural stopper provided on the outer peripheral surface of the cylindrical section of the wheel rim for enabling the at least one static runflat device to removably secure to the outer peripheral surface of the cylindrical section of the wheel rim.

Referring to FIG.1 is a diagram 100 depicting a sectional view of a drop center wheel and an annular static runflat. In accordance with a non limiting exemplary embodiment of the present invention, the sectional view of a drop center wheel and the annular static runflat depicts a tire 102, an annular static runflat 104, a wheel rim 106, a runflat section 108 and a structural stopper 110.

According to a non limiting exemplary embodiment of the present invention, the annular static runflat 104 is secured to an outer peripheral surface of a cylindrical section of a drop center wheel rim 106. The annular static run flat 104 is spaced from the properly inflated tire and allowed to be engaged to an inner peripheral surface of the tire 102, when the tire 102 is operated in an under-inflated or deflated or run-flat condition. The annular static runflat 104 is enabled to be removably secured with the cylindrical section of the drop center wheel rim 106. The drop center wheel rim 106 made by rolling steel sheet and joined by welding and or casting/forging process.

In accordance with a non limiting exemplary embodiment of the present invention, the structural stopper 110 for securing the annular static runflat 104 preferably includes an alphabetical shaped provision (for example an H shaped provision). The structural stopper 110 arrests the undesirable rotation or movement of the annular static, runflat 104 over the outer peripheral surface of the drop center wheel rim 106 made by rolling steel sheet and joined by welding and casting/forging process.

Figure 2:
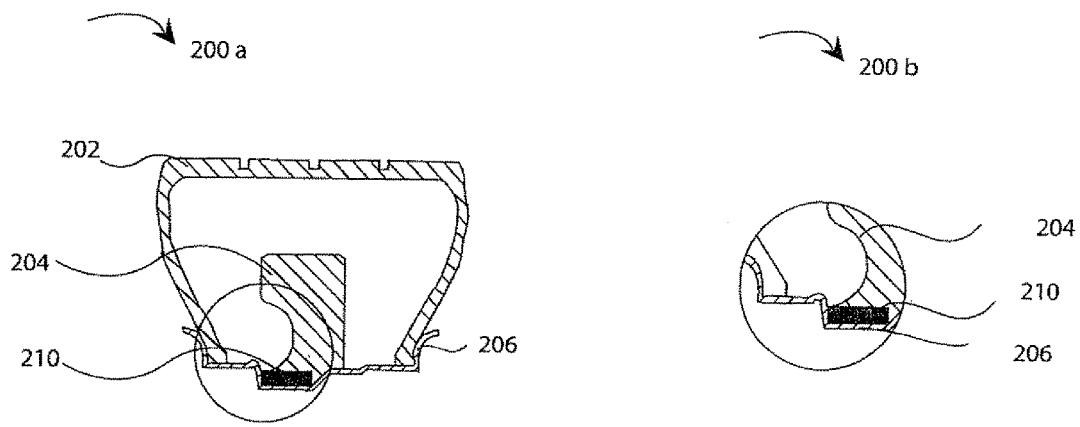
FIG. 2 is a diagram depicting fragmental views of a drop center wheel and an annular static runflat.

Referring to FIG.2 is a diagram 200 depicting fragmental views 200a and 200b of a drop center wheel and an annular static runflat. According to a non exemplary embodiment of the present invention, the annular static run flat 204 includes segments assembled around the drop center wheel rim 206. The structural stopper 210 is welded on the flat wheel rim 202 between the overlapped segments of the static run flat 204 to arrest the rotation of static run flat 204 on the wheel rim 102. The wheel rim 202 materials include steel alloy, aluminum and the like.

According to a non limiting exemplary embodiment of the present invention, the annular static runflat system 204 further includes a female provision for securing with the structural stopper 210. The annular static runflat 204 is engaged to the inner peripheral surface of the tire 202 when the tire 202 is operated in the runflat condition. The annular static runflat assembly 204 includes single or multiple segments surrounding the outer peripheral surface of the cylindrical section of the drop center wheel rim 206.

Referring to FIG. 3 is a diagram 300 depicting a sectional view of a flat wheel and an annular static runflat system. The sectional view of a flat wheel and an annular static runflat system depicts a tyre 302, an annular static runflat system 304, a drop center wheel rim 306, and the structural stopper 310. The annular static runflat system 304 gets accommodated on the outer peripheral surface of the cylindrical section of the drop center wheel rim 306. The structural stopper 310 secures the annular static runflat system 304 over the drop center wheel rim 306 in an under-inflated or deflated or run-flat condition.

Referring to FIG. 4 is a diagram 400 depicting fragmental view of a flat wheel and an annular static runflat system. The fragmental view depicts a tyre 402, an annular static runflat system 404, a drop center wheel rim 406, and the structural stopper 410.

As will be appreciated by a person skilled in the art the present invention provides a variety of advantages. Firstly, the present invention is to provide a structural stopper on steel wheel rim to increase the static run flat system capability by reducing the friction between the static run flat and the wheel rim. Secondly, the present invention stand by to its name of being static and provides maximum vehicular wheel traction to the vehicle in a run flat condition. Thirdly it overcomes the issue relating regular maintenance issue with vibrations and noise.

The invention claimed is:

1. An enhanced static runflat system, comprising:
    a wheel, rim comprising a cylindrical section intermittent and a rim base comprising a flange extending radially outwards from two axial ends, whereby a plurality of circular heads of a tire securely mounted on the wheel rim;
    an annular static runflat removably directly secured to an outer peripheral surface of the cylindrical section of the drop center wheel rim, such that the annular static runflat further spaced from the properly inflated tire and is configured to be engaged to an inner peripheral surface of the tire when the tire is deflated; and
    at least one predefined structural stopper provided on a portion of the circumference of the outer peripheral surface of the cylindrical section of the drop center wheel rim, and configured to engage a corresponding female provision defined on a portion of an inner circumference of the annular static runflat, such that the at least one predefined structural stopper secures the inner circumference of the annular static runflat to an outer circumference of the wheel for arresting rotation and movement of the static runflat over the outer peripheral surface of the drop center wheel rim.

2. The enhanced static runflat system assembly of claim 1, wherein the wheel rim comprising at least one of: a drop center wheel rim, a bolt on wheel rim, multi piece wheel, and a flat wheel rim made by rolling steel sheets and joined by welding or and casting/forging process.

3. The enhanced static runflat system of claim 1, wherein the annular static runflat comprising a plurality of segments.

4. The enhanced static runflat system assembly of claim 1, wherein an inner peripheral surface of the annular static runflat comprising at least one structural provision for securing with the outer peripheral surface of the cylindrical section of the wheel rim.

5. An enhanced static runflat system assembly, comprising:
    an annular static runflat comprising at least one structural provision along an inner peripheral surface, such that the annular static runflat device is removably directly secured to an outer peripheral surface of a cylindrical section of a drop center wheel rim; and
    at least one predefined structural stopper provided on a portion of the circumference of the outer peripheral surface of the cylindrical section of the drop center wheel rim, and configured to engage a corresponding female provision defined on a portion of an inner circumference of the annular static runflat, such that the at least one static runflat is removably secured to the outer peripheral surface of the cylindrical section of the drop center wheel rim precluding thereby rotation and movement of the static runflat over the outer peripheral surface of the drop center wheel rim.

6. The enhanced static runflat system assembly of claim 5, wherein the wheel rim comprising a cylindrical section intermittent and a rim base comprising a flange extending radially outwards from two axial ends.

7. The enhanced static runflat system of claim 5, wherein the annular static runflat further spaced from the properly inflated tire.

* * * * *